(12) United States Patent
Placzek et al.

(10) Patent No.: US 10,233,955 B2
(45) Date of Patent: Mar. 19, 2019

(54) CONNECTING ELEMENT FOR SECURING TWO HALF-SHELLS OF A BELT BUCKLE

(71) Applicant: Autoliv Development AB, Vårgårda (SE)

(72) Inventors: Melanie Placzek, Barmstedt (DE); Dietmar Legde, Hamburg (DE); Michel Hermann, Ludwigslust (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 161 days.

(21) Appl. No.: 15/118,155

(22) PCT Filed: Feb. 10, 2015

(86) PCT No.: PCT/EP2015/052718
§ 371 (c)(1),
(2) Date: Aug. 11, 2016

(87) PCT Pub. No.: WO2015/121234
PCT Pub. Date: Aug. 20, 2015

(65) Prior Publication Data
US 2017/0167515 A1    Jun. 15, 2017

(30) Foreign Application Priority Data
Feb. 13, 2014 (DE) .................. 10 2014 202 618

(51) Int. Cl.
*F16B 5/06* (2006.01)
*A44B 11/25* (2006.01)

(52) U.S. Cl.
CPC ........ *F16B 5/0664* (2013.01); *A44B 11/2546* (2013.01)

(58) Field of Classification Search
CPC .. A44B 11/2546; F16B 5/0664; F16B 21/082; F16B 21/084; F16B 21/086; F16B 21/088
(Continued)

(56) References Cited

U.S. PATENT DOCUMENTS 3,583,530 A   6/1971  DeVenne et al.
3,883,258 A   5/1975  Hewson
(Continued)

FOREIGN PATENT DOCUMENTS

DE   31 28 139       3/1983
DE   102 59 115 A1   7/2004
(Continued)

OTHER PUBLICATIONS

German Examination Report—dated Oct. 20, 2014.
PCT International Search Report—dated Mar. 10, 2015.

*Primary Examiner* — Robert Sandy
(74) *Attorney, Agent, or Firm* — Brinks Gilson & Lione

(57) ABSTRACT

A connecting element (30) for fixation of two half-shells (10, 20) of a buckle cover (5) for a seat belt buckle. The connecting element (30) includes two externally profiled end-sections, an anchoring section (21) that is mounted to a first half-shell (20), with a fastening section (11) adjoining a separation section (15), The connecting element (30) is connected to the half-shell (20) in a material-bonded or interference-fit manner and the fastening section (11) is connected in a friction- and interference-fit manner to the additional half-shell (10). The fastening section (11) includes a core plug (14) that tapers conically toward the free end, and having a symmetrically or asymmetrically formed ramp-shaped structure formed of single ramp-shaped sections (13) that widen respectively in the direction of the separation section (15).

17 Claims, 3 Drawing Sheets

(58) Field of Classification Search
USPC .......................................................... 411/510
See application file for complete search history.

(56) References Cited

U.S. PATENT DOCUMENTS

| | | | |
|---|---|---|---|
| 4,597,141 | A | 7/1986 | Wier |
| 5,722,129 | A | 3/1998 | Harrison et al. |
| 6,002,325 | A | 12/1999 | Conway |
| 6,473,947 | B2 | 11/2002 | Yun |
| 8,028,962 | B2 * | 10/2011 | Geiger .................. F16L 3/2332 174/656 |
| 8,955,204 | B2 | 2/2015 | Scharnberg |
| 2005/0135968 | A1 | 6/2005 | Augstein |
| 2008/0238074 | A1 | 10/2008 | Marriott |
| 2009/0324360 | A1 * | 12/2009 | Schuech ............... F16B 21/082 411/33 |

FOREIGN PATENT DOCUMENTS

| | | |
|---|---|---|
| DE | 10 2006 049 335 A1 | 4/2008 |
| DE | 10 2008 030 048 A1 | 12/2009 |
| DE | 10 2012 200 242 A1 | 7/2013 |
| EP | 0 305 444 B1 | 8/1992 |
| FR | 2 509 616 | 7/1982 |

\* cited by examiner

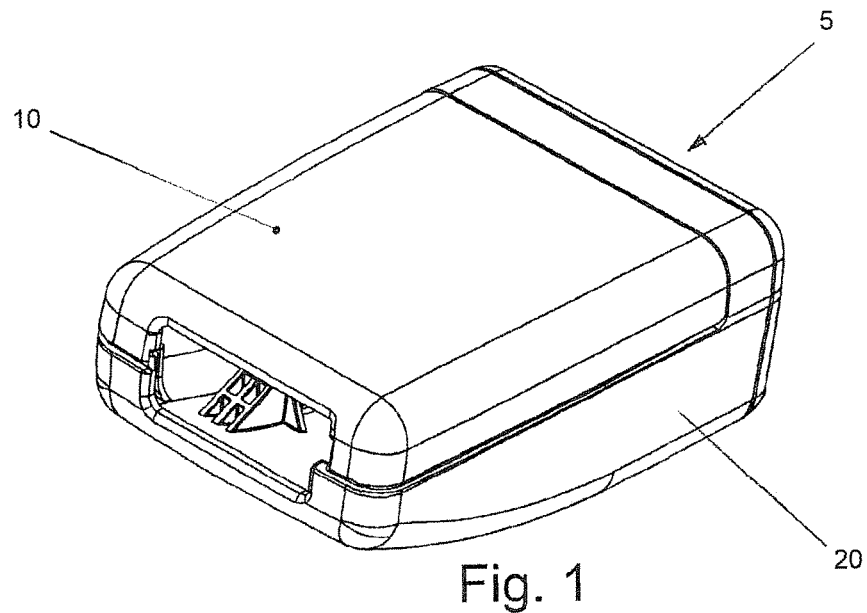
Fig. 1
Fig. 2
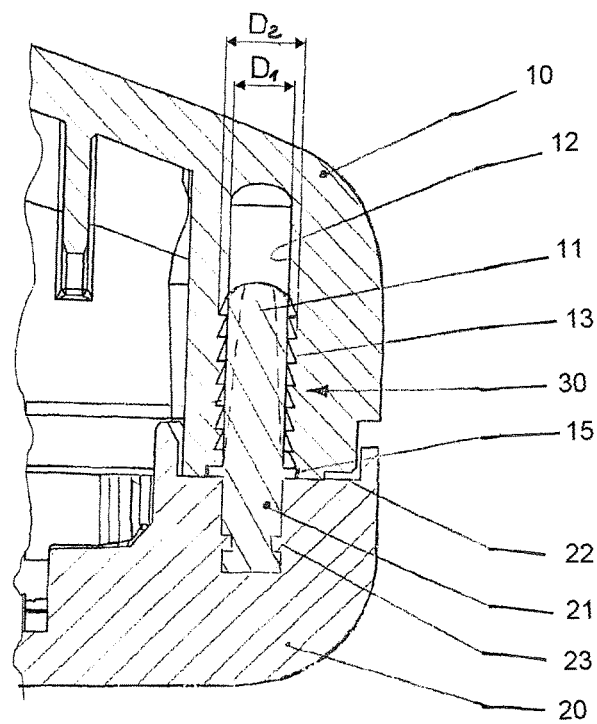

CONNECTING ELEMENT FOR SECURING TWO HALF-SHELLS OF A BELT BUCKLE

CROSS REFERENCE TO RELATED APPLICATIONS

This application claims priority to German Patent Application No. 10 2014 202 618.0, filed on Feb. 13, 2014 and PCT/EP2015/052718, filed on Feb. 10, 2015.

FIELD OF THE INVENTION

The invention relates to a connecting element for fixating two half-shells of a buckle cover associated with a belt buckle of a seat-belt system, as well as a method of joining two half-shells.

BACKGROUND

Belt buckles for the seat-belt system in motor vehicles normally include a buckle cover having two joined half-shells that encloses a metallic carrier, a release button, and a latch mechanism. A belt buckle of this type is known for example from EP 0 305 444 B1. The half-shells of a belt buckle can be joined by various methods. For example, it is known to screw the half-shells together. A further possibility consists in materially connecting the half-shells by a welding process. Finally, the half-shells can be connected by interference-fit and/or friction-fit snap connections.

A connecting element of the above-described type is known from DE 10 2012 200 242 A1 that is fixed in position in a half-shell using an end-side retaining plate. In an assembled state, a fastening section of the connecting element is friction-fit into an opening of the associated further half-shell, which opening is formed as a bore. For that purpose, the fixation section includes a restrictedly elastic, ramp-like profile, whose diameter is greater than the diameter of the bore.

According to DE 10 2008 030 048 A1, a plurality of connecting pins with externally profiled end-sections are provided for reciprocal fastening of the half-shells, the connecting pins engaging respectively in bores in the half-shells. Here, in the unassembled state, the outside diameter of the profiled end sections is greater than the diameter of the bores. For assembly, the end-sections are pressed into the bores, where they are held in a friction-fit manner due to the overlapping profile. At the same time, the assembly requires a parallel insertion of the respective end-sections of the connecting pins into the half-shells.

From DE 10 2006 049 335 A1, a fastening arrangement is known wherein a bolt with an anchoring section including an external thread is fixated in a material-bonded manner in a bore of a first component. Facing away from the anchoring section, the fastening arrangement incorporates a fastening section having a plurality of truncated cones aligned axially to each other, the truncated cones also forming undercuts. In the assembled state, the fastening section is held in an interference- and friction-fit manner in at least one second component.

The object of the present invention is to offer a connecting element that can be produced in a cost-efficient manner for attaching two half-shells of the buckle cover of a belt buckle, for providing a simple and cost-efficient assembly, and enabling the half-shells of the buckle cover to be securely and durably joined.

SUMMARY AND INTRODUCTORY DESCRIPTION OF INVENTION

The above mentioned object is achieved in accordance with the connecting element as well as by a method in accordance with the present invention.

The connecting element according to an embodiment of this invention is inserted in a material-bonded or friction-fit manner into a first half-shell and inserted, with the fastening section, in a friction- and/or interference-fit manner, into a second half-shell of the buckle cover of a belt buckle. In addition, the fastening section has a core plug that tapers conically toward a free end, the core plug having, on the outside, a symmetrically or asymmetrically embodied structure made of individual ribs.

A feature of the invention is to provide a connecting element that can be manufactured in a cost-efficient manner, with which a durable connection between two half-shells of a buckle cover of a belt buckle is achievable. The connecting element advantageously makes possible simple and secure assembly with low equipment costs, wherein the connecting elements, in a finished component, are advantageously integrated into the half-shells. Due to the inventive connecting elements, the half-shells are joined in such a manner that a detachment or separation of the half-shells is only possible with great exertion of force and/or cannot be done non-destructively.

The structure of the inventive connection element differs from the previously known solutions wherein the connecting element or the connecting pin has uniformly shaped, externally-profiled end-sections, or ribs across the entire length. This results in a consistent rigidity of all sections or ribs, which means that a pressing-in force of the connecting pins increases with the insertion depth.

In contrast, due to the inventive concept, there is advantageously a nearly constant pressing-in force of the connecting pins until an end-position of the joined components is reached. In addition, with the inventive concept, an increased retention force is realized.

The elastic sections at the end of the conical core plug in accordance with the present invention make possible, on the one hand, a simplified inserting and centering of the connecting element in the associated bore or opening of the associated additional component. On the other hand, the sections or ribs that are continuously more rigid in the direction of the separation section bring about a more secure and more durable seat or retention of the fastening section in the half-shell bore.

The present invention advantageously makes it possible to reduce a cycle-time of the preferably automated assembly of the belt buckle, because even before a joining of the two half-shells, the connecting elements are durably fixed with an anchoring section in a first half-shell. The subsequent automated joining process of the half-shells is limited to the inserting of the fastening section into the recess, formed like a blind-hole, of the second associated half-shell, before both half-shells are joined. In that way, there is, in addition to optimized process reliability, a cost advantage as well.

An additional advantage is that the connecting element in accordance with this invention is transferrable to existing buckle covers and thus belt-buckle concepts, because they are integratable into the available installation space and do not require any change in the external configuration of the half-shells. The inventive connecting elements are preferably inserted parallel to each other and symmetrical to an axis of symmetry into the associated half-shells in order to achieve a consistent distribution of forces.

Furthermore, a standardized connecting element is provided by the present invention which can, for example, be used for additional elements of the safety-belt system because this connecting element is advantageously insertable into the existing installation space without additional measures. Furthermore, it is clear that the connection element can be used generally for applications wherein two manufactured elements, particularly those made from plastic, are joined.

According to a preferred further development of the invention, it is proposed that the ribs are formed of ramp-shaped, preferably elastic sections, wherein the outer diameters of the ribs are the same, or can also continuously change.

Furthermore, the ribs can in each instance widen in the direction of the separation section.

Overall, the joining operation of the half-shells of the belt buckle can be further simplified by the proposed embodiments of the ribs. Due to the core plug conically tapering toward the end, the ribs become more flexible toward the free end of the fastening section and more rigid toward the separation plane of the connecting element. In this way, on the one hand, the insertion operation of the connecting element can be simplified, and the fastening at the end of the joining can be made more rigid.

According to a further preferred embodiment of the invention, it is provided that a profiling is introduced in the receptacle of the half-shell intended for the connecting element, the profiling being embodied as complementary to the ribs. Due to the profiling that is embodied as complementary to the ribs of the fastening section, in an end position, when finishing the buckle cover, or as the case may be the belt buckle, an interference-fit interlocked connection takes place between the connecting element and the half-shell in in the region of the mounting.

As an additional or complementary measure, in order to secure the fastening section in the half-shell, the invention includes a connecting element with asymmetrically formed ribs. To this end, these ribs are preferably divided circumferentially into two segments or regions, each extending 180° around the circumference, which, offset relative to each other, form an offset in height. Alternatively, the ribs can inventively be divided into more than two regions. In an additional supplementary design, the asymmetrically formed ribs of the fastening sections are associated with correspondingly complementary profilings in the mounting of the half-shell.

The constructive concept of the asymmetrically disposed sections, in connection with the profilings in the recess, advantageously make possible an optimal distribution of the load or tensile force that extends to different planes.

A preferred geometrical design of the fastening section of the connecting element provides for a cone angle $\alpha$ of $\geq 2°$. In this way, the core plug tapers continuously up to the free end of the fastening section. With this geometrical design of the conical progression, the latter become longer with increasing distance from the separation section of the connecting element, along with a greater elasticity of the end-side ramp-shaped sections compared to the more rigid sections in the region of the separation section. These measures ensure a desired, virtually consistent pressing-in force of the connecting elements until achievement of a reciprocal contact of both half-shells of the buckle cover. For targeted exertion of influence on the force necessary to press in the connection elements, both the cone angle $\alpha$ and the lead angle $\beta$ of the envelope surface of the ribs can be changed. It is furthermore provided that with an anchoring section fixed in a material-bonded manner in the half-shell, the separation section of the connecting element abuts flush against the half-shell. Here the diameter of the separation section is greater than the diameter of both the fastening section and the anchoring section.

As a material-bonded connection for fixing the position of the anchoring section in a half-shell, it is inventively provided that the connection element is designed as an insertion part for an injection-molding tool which, during the plastic injection-molding process, is extrusion-coated with the material of the associated half-shell and in that way connected to the half-shell in a material-bonded manner. As a measure for achieving an improved material-bond securing, the anchoring section of the connecting element has at least one, in particular circumferential constriction that forms an undercut, which is completely filled during the injection molding process. Alternatively to a circumferential constriction or annular groove, the anchoring section of the connecting element can incorporate a plurality of constrictions, partial recesses, or also a through-opening, each of which is completely filled with plastic during the injection molding process.

Furthermore, in order to achieve an effective, material-bonded connection and an installation position that is free of clearance for the connecting element, the surface of the anchoring section can be knurled in order to create a specific outer profiling, or it can be provided with a defined roughness.

Polyamide is preferably suitable as a material for the inventive connecting element. In using it, the connecting element can, for example, be formed both as an insertion part made of PA 66 or produced in a 2K injection process, where the half-shells are formed of PP and the connecting element of PA.

A method including the following steps is envisaged for the assembly process in accordance with the present invention, a joining of two half-shells of a belt buckle. First the half-shells are produced by a plastic injection molding process. In order to fix them in position, the respective anchoring section of the connecting elements, as an insertion part, is embedded in the plastic during the injection molding process of the first half-shell. Then there is an alignment of the second half-shell opposite the first half-shell in an end position that corresponds to both half-shells. This is followed by insertion of the fastening sections of the connecting elements into bores in the second half-shell, wherein the outer diameter of the profiled fastening sections, in the unassembled state, is greater than the diameter of the bores. Finally, using a pressing tool, the half-shells are pressed, with the application of force, until they reach a reciprocally-supporting end-position, whereby the ramp-shaped sections of the connecting sections are elastically deformed, and the half-shells are retained in a force-locking manner.

BRIEF DESCRIPTION OF THE DRAWINGS

The invention will be explained below with reference to the accompanying Figures.

FIG. 1 shows a buckle cover in a perspective;

FIG. 2 shows a sectional view of the buckle cover from FIG. 1 in a sectional representation;

DETAILED DESCRIPTION

Figure 3:
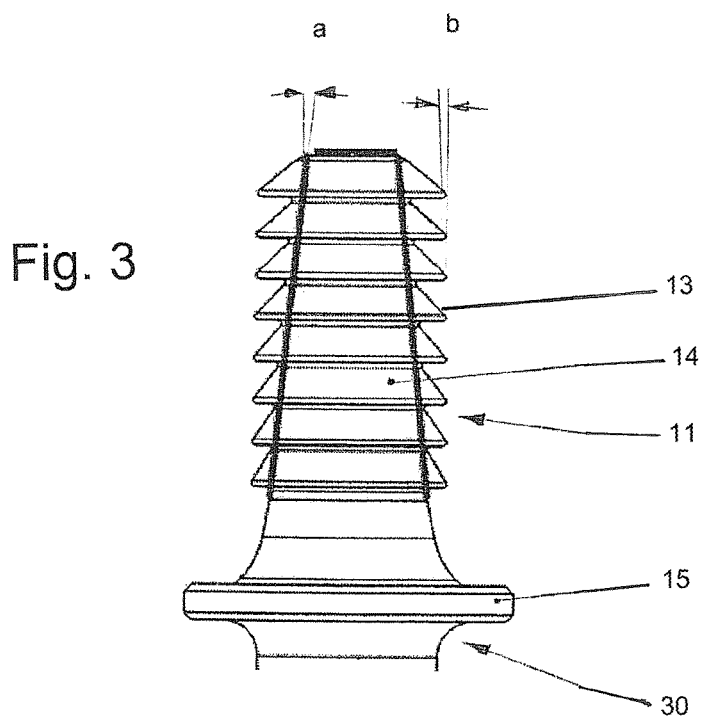
FIG. 3 shows a partial view of the inventive connecting element.

FIG. 1 shows a buckle cover 5, an outer casing of an otherwise not illustrated belt buckle for a seat-belt system. The buckle cover 5 serves to receive a locking mechanism known in the art, with which a release button (not shown) is associated. The buckle cover 5 is formed of two half-shells 10, 20, which are held together by separate connecting elements.

FIG. 2 clarifies the installation position of a connecting element 30 integrated inside the buckle cover 5, the connecting element 30 being inserted in a material-bonded manner in a recess 12 of the half-shell 10 with a fastening section 11 and with an anchoring section 21 inside the half shell 20. As a measure for achieving a friction-fit installation position, the fastening section 11 is fixated in the receptacle 12 of the half-shell 10 by an outer profiling in the form of restrictedly elastic, regularly or irregularly circumferentially distributed ramp-shaped sections 13. In this embodiment, the ramp-shaped sections 13 form the ribs on the fastening section 11. A maximum outer diameter $D_2$ of the fastening section 11 in the region of the ramp-shaped sections 13 is greater than the associated diameter $D_1$ of the recess 12. The anchoring section 21 is shown in an installation position enclosed by the plastic of the half-shell 20. This interference-fit or interlocking connection can be realized by a plastic injection-molding process, wherein the anchoring section 21 is inserted as an insertion part, for example one made of PA 66, into an injection-molding tool and thereby enclosed by the plastic, for example PP, of the half-shell 20. Instead of the use of an insertion part, the connecting element 30 can be produced in a two-stage injection-molding process (2K injection-molding process), wherein the different plastics are injected successively. For better securing of the anchoring section 21 in the plastic, the anchoring section 21 has a constriction that forms an undercut 23, which is filled during the injection-molding process. The connecting element 30 also forms a separation section 15 between the fastening section 11 and the anchoring section 21. In an installed state, the separation section 15, which in comparison to the other sections of the connecting element 30 has an enlarged diameter, is supported against a joining contour 22 of the half-shell 20. In addition, the fastening section 11 is formed as rounded at the end, in order to simplify the insertion of the connecting element 30 into the receptacle 12 in the half-shell 10 during assembly.

FIGS. 3 to 6 show, in enlarged representations, for the purpose of clarifying the invention, details of sections of the connecting element 30. The reference numbers for the same or functionally identical components or regions correspond to those of FIG. 2. The following descriptions are therefore restricted to the greatest extent possible to different embodiments that are inventively essential.

FIG. 3 shows the construction of the fastening section 11 of the connecting element 30. The fastening section 11 is folded by the core plug 14 that tapers continuously conically from the separation section toward the free end. On the outside, the core plug 14 is encompassed by the symmetrically arranged ramp-shaped sections 13. The ramp-shaped sections 13, arranged one after the other to form a saw-tooth profile on the outside, expand respectively in the direction of the separation section 15. Due to the conical core plug 14, the sections 13 extend with an increasing distance to the separation section 15. Contrary to the conically narrowing core plug 14, an outer contour of all ramp-shaped sections 13 widens, starting at the separation section 15. Due to this measure, the elasticity of the end-side ramp-shaped sections 13 increases compared to the sections 13 near the separation section 15. For the core plug 14, a cone angle of $\alpha \geq 2°$ or also 5° is preferred, and for the outer contour of the elastic sections 13, a lead angle of $\beta \geq 2°$ is provided, whereby the lead angle $\beta$ can also be 0 degrees, because the simplified mounting is substantially achieved by the cone angle $\alpha$ of the core plug 14. In order to exercise a targeted effect on the force needed to press in the connecting element 30, as well as on the retaining force of the connecting element 30, both the cone angle $\alpha$ and the lead angle $\beta$ can be changed.

Figure 4:
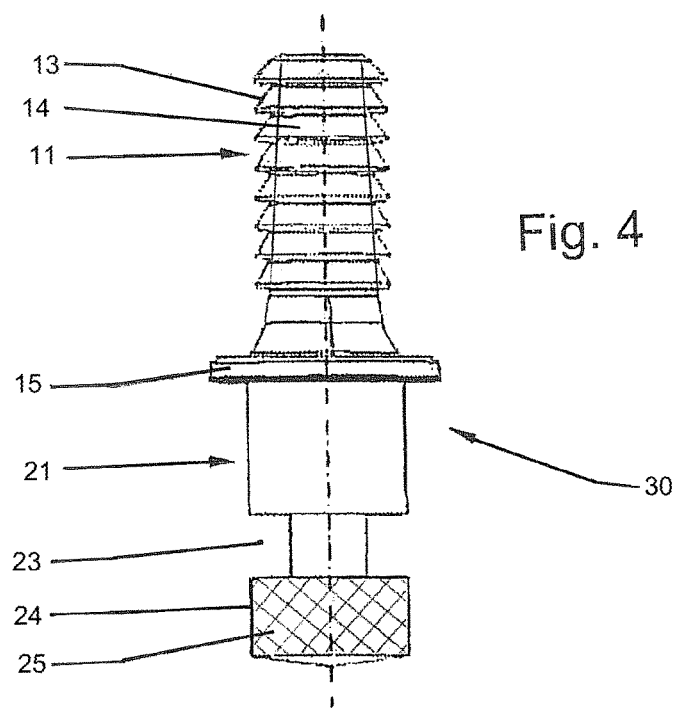
FIG. 4 shows an inventive connecting element in a single-part drawing.

FIG. 4 illustrates, in particular, the design of the anchoring section 21 of the connecting element 30. For improved fixation in the plastic during the injection-molding process for producing the half-shell 20, the constriction 23 forming an undercut is made in the anchoring section 21. Complementary or supplementary to that, a knurling 25 or any profiling can be applied to the surface 24 of the anchoring section 21.

Figure 5:
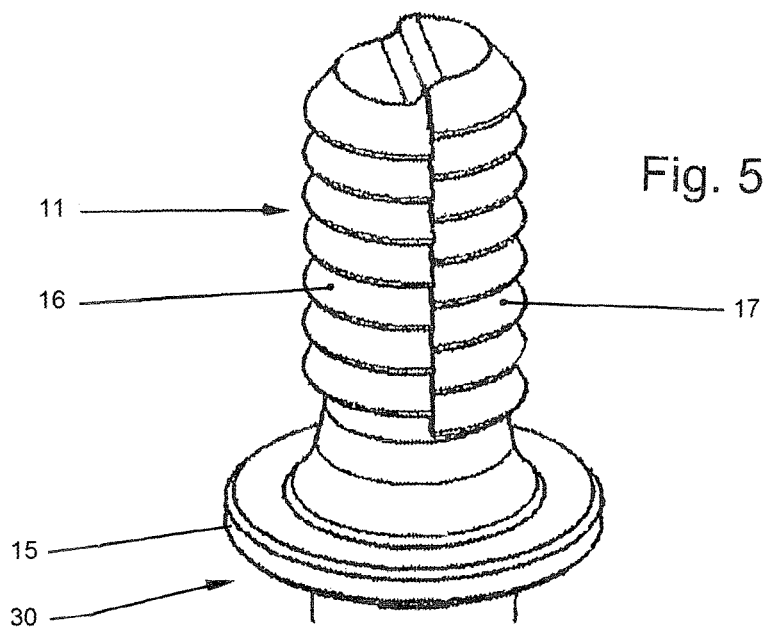
FIG. 5 shows a detail view, in a perspective, of the inventive connecting element.
Figure 6:
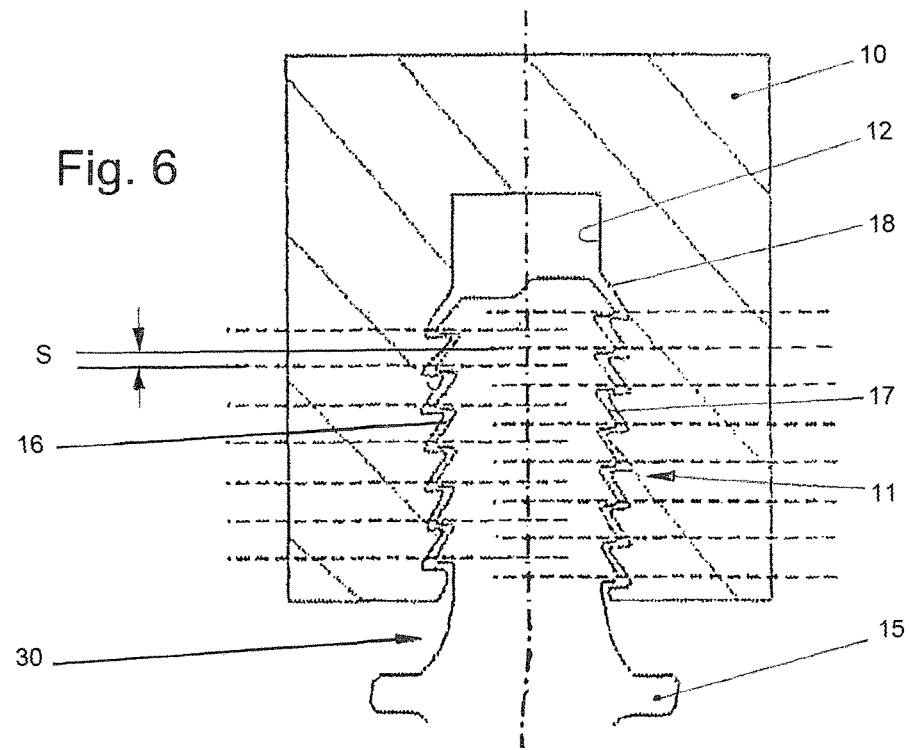
FIG. 6 shows the connecting element according to FIG. 5 in the installed state.

FIGS. 5 and 6 show the connecting element 30, wherein the elastic sections 13 of the fastening section 11 respectively form segments 16, 17 that are offset from each other in order to create an asymmetrical outer structure. FIG. 5 shows the fastening section 11 in a perspective view and illustrates the offset segments 16, 17 of the elastic sections 13 that form the two halves. In FIG. 6, due to the installation position of the connecting element 30 in the half-shell 10, an offset in height S resulting from offset segments 16, 17 becomes clear. For optimal force transmission, in an embodiment of this invention the segments 16, 17 engage in an interference-fit manner in a profiling 18 with a complementary shape on the inner wall of the receptacle 12 of the half-shell 10.

While the above description constitutes the preferred embodiment of the present invention, it will be appreciated that the invention is susceptible to modification, variation and change without departing from the proper scope and fair meaning of the accompanying claims.

The invention claimed is:

1. A connecting element for fixating first and second half-shells of a buckle cover associated with a belt buckle of a seat-belt system, comprising,
   an anchoring end section inserted in a material-bonded or a friction-fit manner into the first half-shell,
   a fastening end section adjoining a separation section, the fastening end section being pressed in a friction-fit or an interference fit manner into a receptacle of the second half-shell, and
   the fastening end section having a core plug with a conically tapering shape at a free end, the core plug having, on the outside of the core plug, a symmetrically or asymmetrically formed structure formed of individual ribs extending along the fastening end section, the core plug forming the conically tapering shape in a region forming the ribs.

2. A connecting element according to claim 1 further comprising in that the ribs are formed by ramp-shaped sections.

3. A connecting element according to claim 1 further comprising in that the outer diameters of the ribs are uniform or vary continuously along the length of the fastening end section.

4. A connecting element according to claim 1 further comprising in that the ribs respectively widen in the direction of the separation section.

5. A connecting element according to claim 1 further comprising the asymmetrically formed structure of the ribs of the connecting element have segments that are offset relative to each other, forming an offset in height.

6. A connecting element according to claim 1 further comprising the core plug of the connecting element tapers toward the free end of the fastening section at an angle $\alpha \geq 2°$.

7. A connecting element according to claim 1 further comprising the anchoring end section that is fixed in a material-bonded manner in the first half-shell abuts flush against the first half-shell, wherein the diameter of the separation section is greater than the diameters of the fastening end section and the anchoring end section.

8. A connecting element according to claim 1 further comprising the anchoring end section of the connecting element is formed as an insertion part or is coated with a plastic of the first half-shell.

9. A connecting element according to claim 1 further comprising a surface of the anchoring end section of the connecting element has a knurling or a defined roughness.

10. A connecting element according to claim 1 further comprising the connecting element is made of polyamide.

11. A connection element according to claim 1 further comprising the receptacle in the form of a smooth sided blind bore.

12. A connecting element according to claim 1 further comprising the individual ribs are formed such that the radial depth of the ribs measured between an outer diameter of the ribs and a base of the ribs at the core plug decreases from the ribs located near the distal end of the fastening end section as compared with the ribs located near the separation section.

13. A connecting element according to claim 12 further comprising the individual ribs have a constant outer diameter along the length of the fastening end section.

14. A connecting element for fixating first and second half-shells of a buckle cover associated with a belt buckle of a seat-belt system, comprising;
   an anchoring end section inserted in a material-bonded or a friction-fit manner into the first half-shell,
   a fastening end section adjoining a separation section, the fastening end section being pressed in a friction-fit or an interference fit manner into a receptacle of the second half-shell,
   the fastening end section having a conically tapering core plug at a free end, the core plug having, on the outside of the core plug, a symmetrically or asymmetrically formed structure formed of individual ribs; and
   the receptacle of the second half-shell forming a profiling is formed as complementary to the ribs.

15. A connecting element for fixating first and second half-shells of a buckle cover associated with a belt buckle of a seat-belt system, comprising;
   an anchoring end section inserted in a material-bonded or a friction-fit manner into the first half-shell,
   a fastening end section adjoining a separation section, the fastening end section being pressed in a friction-fit or an interference fit manner into a receptacle of the second half-shell,
   the fastening end section having a conically tapering core plug at a free end, the core plug having, on the outside of the core plug, a symmetrically or asymmetrically formed structure formed of individual ribs,
   the anchoring end section of the connecting element has at least one circumferential constriction or partially-made recess forming an undercut, which during a plastic injection-molding process is filled or coated with the material forming the first half shell, and
   the anchoring end section of the connecting element is formed as an insertion part or is coated with the material of the first half-shell.

16. A method of joining two half-shells of a buckle cover including a first half-shell and a second half-shell of a belt buckle comprising the steps of;
   providing a connecting element having an anchoring end section, inserting the anchoring end section in a material-bonded or a friction-fit manner into the first half-shell, providing a fastening end section adjoining a separation section, pressing the fastening end section in a friction-fit or an interference fit manner into a receptacle of the second half-shell, the fastening end section having a conically tapering core plug at a free end, the core plug having, on the outside of the core plug, a symmetrically or asymmetrically formed structure made of individual ribs,
   producing the first half-shell by a plastic injection-molding process, wherein in order to fix the connection element in place, the anchoring end section, as an insertion part, is enclosed by a plastic during the injection-molding process,
   aligning the second half-shell relative to the first half-shell which corresponds to an end-position of the first and second half-shells,
   inserting the fastening end section of the connecting element in receptacle formed by the second half-shell, wherein an outer diameter of the fastening end section in an unassembled state, is greater than a diameter of the receptacle, and
   exerting a force on the first and the second half-shells by a pressing tool, during which the fastening end section is pressed into the receptacle of the second half-shell to an end-position of reciprocal support of the first and the second half-shells.

17. A method of joining two half-shells of a buckle cover of a belt buckle according to claim 16 further comprising, providing the receptacle in the form of a smooth sided blind bore.

* * * * *